C. BATCHELLER.
Fire Kindler.
No. 101,704.  Patented April 12, 1870.
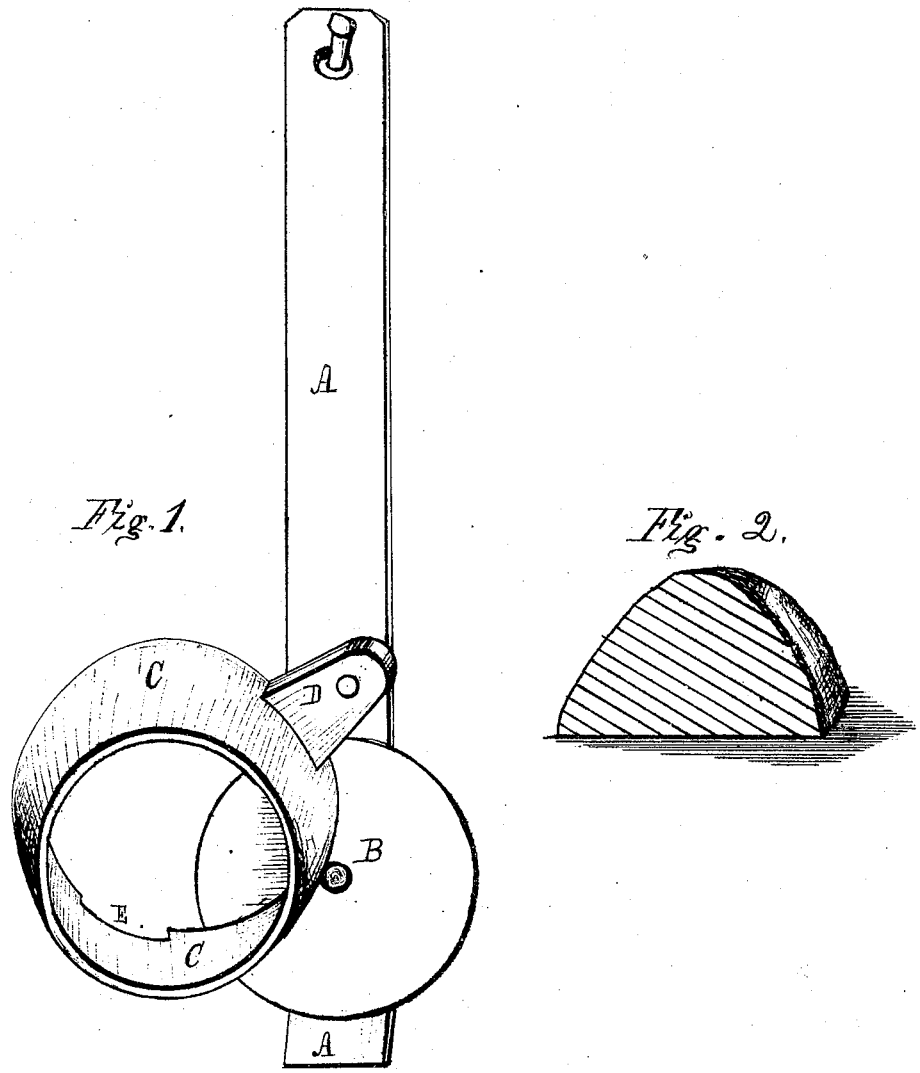

United States Patent Office.

CHARLES BATCHELLER, OF DES MOINES, IOWA.

Letters Patent No. 101,704, dated April 12, 1870.

IMPROVEMENT IN FIRE-KINDLERS.

The Schedule referred to in these Letters Patent and making part of the same.

I, CHARLES BATCHELLER, of Des Moines, in the county of Polk and State of Iowa, have invented certain Improvements in Fire-Kindlers, of which the following is a specification.

My invention consists in forming a fire-kindler of three pieces, so arranged that a piece of chalk or like substance may be held firmly in its place for a wick, and also removed or replaced whenever desired.

Figure 1 is a perspective view, representing my fire-kindler hanging on a nail with the pivoted open bowl moved to one side.

Figure 2 represents a half section of a lump of chalk, such as I place in my open bowl and use as a wick.

A A is a piece of strap-iron, about nine inches long, and about three-fourths of an inch wide.

B is a circular piece of tin or sheet metal, with a rivet in the center, fastening it permanently to the strap-iron.

C C is an open bowl of cast metal, with a projection or handle.

D is the projection or handle of the bowl, and affords the means of securing the bowl with a pivot on the strap-iron.

E shows a slot in the lower edge of the bowl, which fits on the bottom of the strap-iron, when the bowl is in its proper place for use.

The lower end of the strap-iron is slightly bent and forms a spring, which catches in the slot of the bowl and keeps it in place. The bowl is conical in form.

The piece of chalk represented by fig. 2 corresponds with the form of the bowl, and is such as is in common use for chalking marking lines.

One of those pieces of chalk is placed in the open bowl, where it can be firmly secured by the use of the slot E in the bowl, and the spring formed by the lower end of the strap-iron, which together form a simple lock or catch.

When the chalk or wick is consumed or worn out, it can readily be replaced by another piece.

By saturating the chalk with kerosene, or its equivalent, a complete fire-kindler is provided. The chalk absorbs only a small quantity at one time, and, when a lighted match or taper is applied, it will readily ignite and burn freely until the kerosene or its equivalent is entirely consumed.

After being lighted, it can be readily held or placed underneath the grate of a stove, and the blaze allowed to reach and kindle the fuel.

When the fire is thus fairly started, the fire-kindler can be hung up in a convenient place until it is again required.

The fluid applied to the chalk or wick is absorbed, and thereby the danger of dropping and soiling and exploding is prevented.

By the use of my invention much time and kindling-fuel is saved in starting fires.

I am aware that numerous forms of fire-kindlers are in use, and that kerosene and other fluids are used and applied to wicks composed of various materials, but for simplicity, cheapness, and safety, I believe there is none to equal my invention.

Claim.

I claim as my invention—

The construction of a fire-kindler, composed of the strap-iron handle A, the circular piece of metal B, and the open bowl C, substantially as described and for the purposes specified.

CHARLES BATCHELLER.

Witnesses:
CORYDON E. FULLER,
LEWIS J. BROWN.